United States Patent [19]

Tamaki et al.

[11] Patent Number: 5,132,124

[45] Date of Patent: Jul. 21, 1992

[54] POWDERED DRINK BREWING BAG

[75] Inventors: Yohji Tamaki; Naoya Hirayama, both of Aichi, Japan

[73] Assignee: Pokka Corporation, Japan

[21] Appl. No.: 682,277

[22] Filed: Apr. 9, 1991

[30] Foreign Application Priority Data

May 18, 1990 [JP] Japan .............................. 2-52558[U]

[51] Int. Cl.$^5$ ...................... B65D 33/14; B01D 29/03; A47J 31/06
[52] U.S. Cl. ........................................ 426/82; 99/295; 383/33; 383/35; 383/16; 426/77; 426/110; 426/112; 210/474
[58] Field of Search ......................... 426/77–84, 426/110, 112, 115; 383/907, 35, 34, 33, 34.1, 16, 6; 99/295, 304, 306; 210/474

[56] References Cited

U.S. PATENT DOCUMENTS

| 2,805,164 | 9/1957 | Doppler | 426/77 |
| 2,873,905 | 2/1959 | Denton | 383/33 |
| 3,129,815 | 4/1964 | Baxter | 426/115 |
| 3,189,253 | 6/1965 | Mojonnier | 383/35 |
| 3,279,926 | 10/1966 | Aguirrebatres | 426/82 |
| 3,344,734 | 10/1967 | Aguirre-Batres et al. | 426/77 |
| 3,370,524 | 2/1968 | Kasakoff | 426/77 |
| 3,615,708 | 10/1971 | Abile-Gal | 426/77 |
| 3,971,305 | 7/1976 | Daswick | 426/77 |
| 4,250,990 | 2/1981 | Caspar | 426/80 |
| 4,391,366 | 7/1983 | Hirata | 426/115 |
| 4,519,911 | 5/1985 | Shimizu | 426/433 |
| 4,584,101 | 4/1986 | Kataoka | 426/78 |
| 4,715,271 | 12/1987 | Kitagawa | 426/82 |
| 4,863,601 | 9/1989 | Wittekind et al. | 426/82 |
| 4,981,588 | 1/1991 | Poulallion | 426/77 |

FOREIGN PATENT DOCUMENTS

| 0186867 | 7/1986 | European Pat. Off. | 426/77 |
| 1947146 | 12/1971 | Fed. Rep. of Germany | 426/77 |
| 2738969 | 3/1979 | Fed. Rep. of Germany | 426/77 |
| 3638990 | 5/1988 | Fed. Rep. of Germany | 426/77 |
| 204666 | 9/1938 | Switzerland | 426/82 |

Primary Examiner—Steven Weinstein
Attorney, Agent, or Firm—Lowe, Price, LeBlanc & Becker

[57] ABSTRACT

A powdered drink brewing bag comprising a filter paper bag body having gusset walls and containing a powdered material, such as coffee powder therein. A frame type support member formed of thick paper is bonded to opposing walls of the bag body in the vicinity of the upper edge thereof in such a manner that the bag body is held at both surfaces thereof between the opposite surfaces of the support member. Arm portions project outwardly from the portions of the support member which correspond to both sides of the filter paper bag body, and are provided with folds and handles so that the arm portions are bent in the shape of the letter "Y" in plan to enable the gusset walls to be expanded. Accordingly, the upper edge portion of the bag body can be maintained in a largely opened state, so that the hot water can be poured thereinto easily. This enables the brewing bag to be used easily, and a drink, such as coffee to be obtained conveniently.

3 Claims, 3 Drawing Sheets

POWDERED DRINK BREWING BAG

BACKGROUND OF THE INVENTION

1. Field of the Invention

This invention relates to a powdered material-containing bag which enables powdered drinks such as powdered coffee and powdered black tea to be brewed conveniently by simply pouring hot water onto the same bag.

2. Description of the Prior Art

A simple coffee bag consisting of a filter paper bag in which coffee powder is sealed, and adapted to make coffee by placing the same bag on a cup and pouring hot water thereonto has heretofore been put on the market so that regular coffee can be served simply at home or in an office, and the construction of such a coffee bag is known due to, for example, Japanese Utility Model Laid-Open No. 95528/1988, Japanese Utility Model Publication No. 36978/1988, Japanese Utility Model Laid-Open No. 11763/1982 and Japanese Utility Model Laid-Open No. 57556/1985.

A conventional powdered drink brewing bag, such as the above-described coffee bag is formed so that the upper edge portion of a filter paper bag body is opened to pour hot water into the interior thereof. Therefore, it is impossible to sufficiently maintain the upper edge portion of the bag body in an opened state. Moreover, since the diameter of the opened edge portion of the bag body is small, it is difficult to pour hot water thereinto. If hot water is poured into such a small-diameter opening with such difficulty, the user would suffer a burn.

SUMMARY OF THE INVENTION

A primary object of the present invention is to eliminate the above-mentioned drawbacks and provide a conveniently usable powdered drink brewing bag.

To meet this object, the powdered drink brewing bag according to the present invention is formed by bonding a frame type support member, which is formed of thick paper, to the portion of a gusset-carrying filter paper bag body containing a powdered material, such as coffee powder which is in the vicinity of the upper edge thereof in such a manner that the filter paper bag is held at both surfaces thereof between the opposite surfaces of the support member, and providing arm portions, which project outward from the portions of the support member which correspond to both sides of the filter paper bag body, with folds and handles so that the gussets can be expanded with the arm portions bent in the shape of the letter "Y" in plan.

When the handles are pushed inward to bend the arm portions in the shape of the letter "Y" in plan at both sides of the filter paper bag body, the upper edge portion of the bag body can be kept largely open with the gussets in an expanded state.

The above and other objects a well as advantageous features of the invention will become apparent from the following description of the preferred embodiment taken in conjunction with the accompanying drawings.

BRIEF DESCRIPTION OF THE DRAWINGS

The accompanying drawings show an embodiment of the powdered drink brewing bag according to the present invention, wherein.

DESCRIPTION OF THE PREFERRED EMBODIMENT

Figure 1:
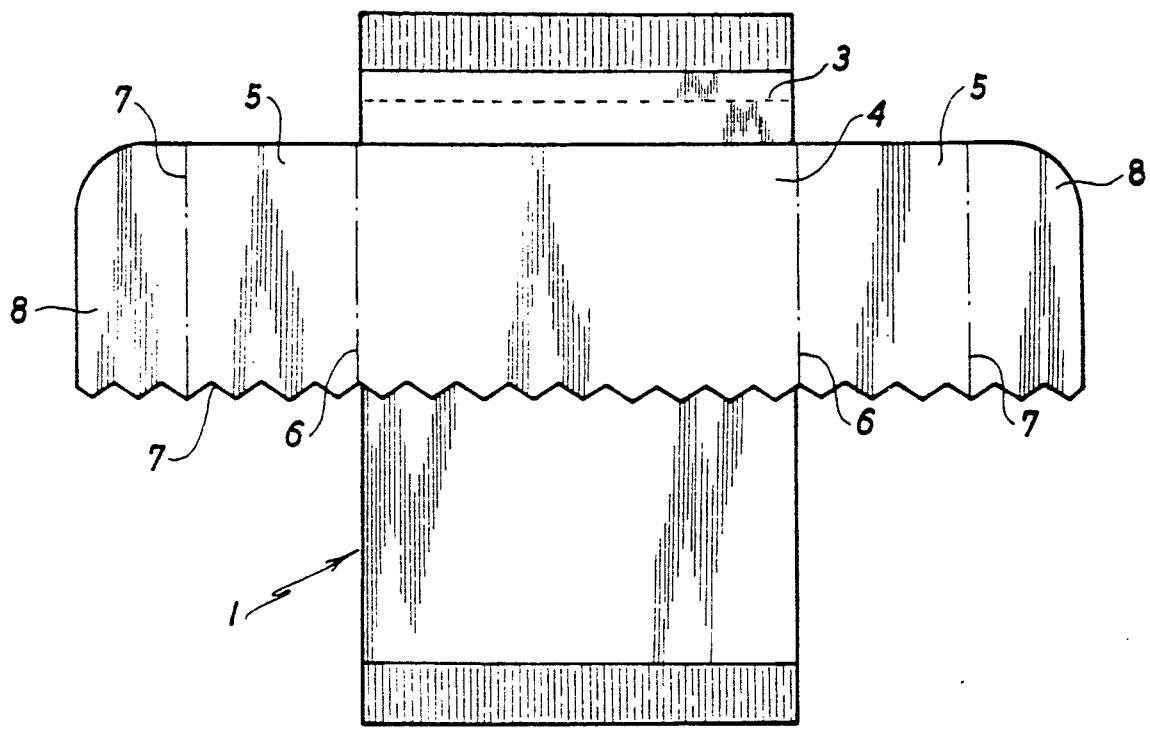
FIG. 1 is a front elevation.
Figure 3:
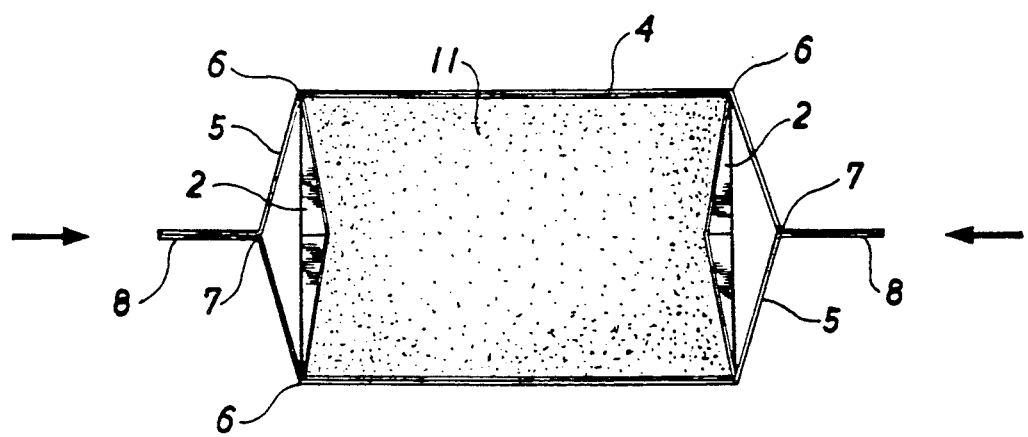
FIG. 3 is a plan view of what is shown in FIG. 2.
Figure 2:
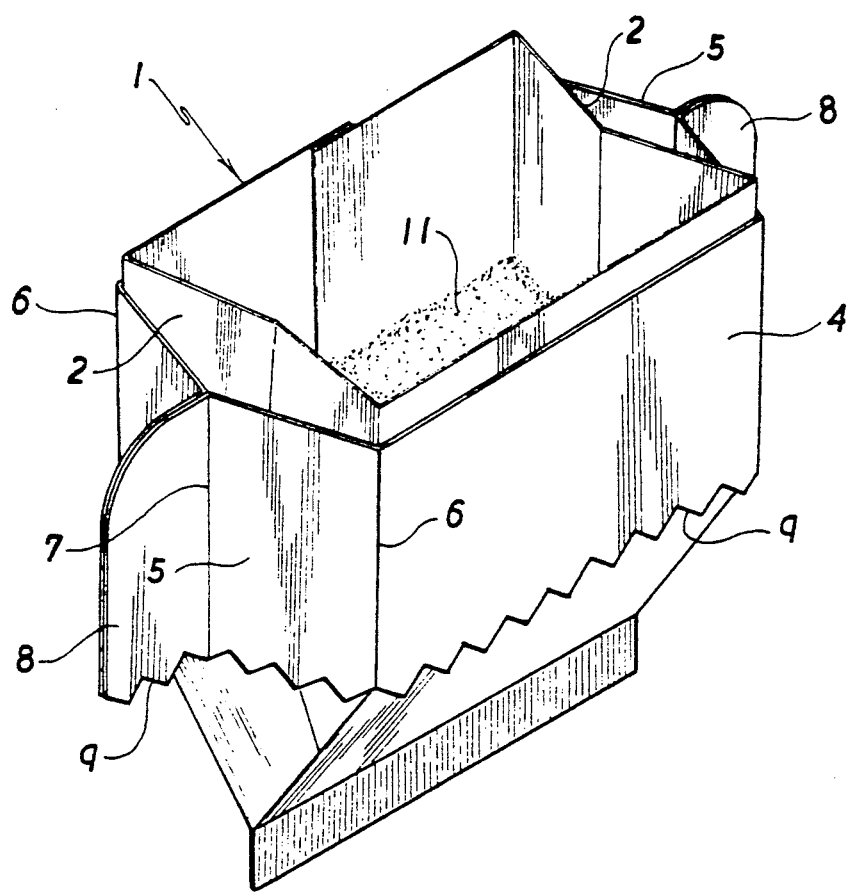
FIG. 2 is a perspective view of the embodiment in the upper edge-opened state.
Figure 4:
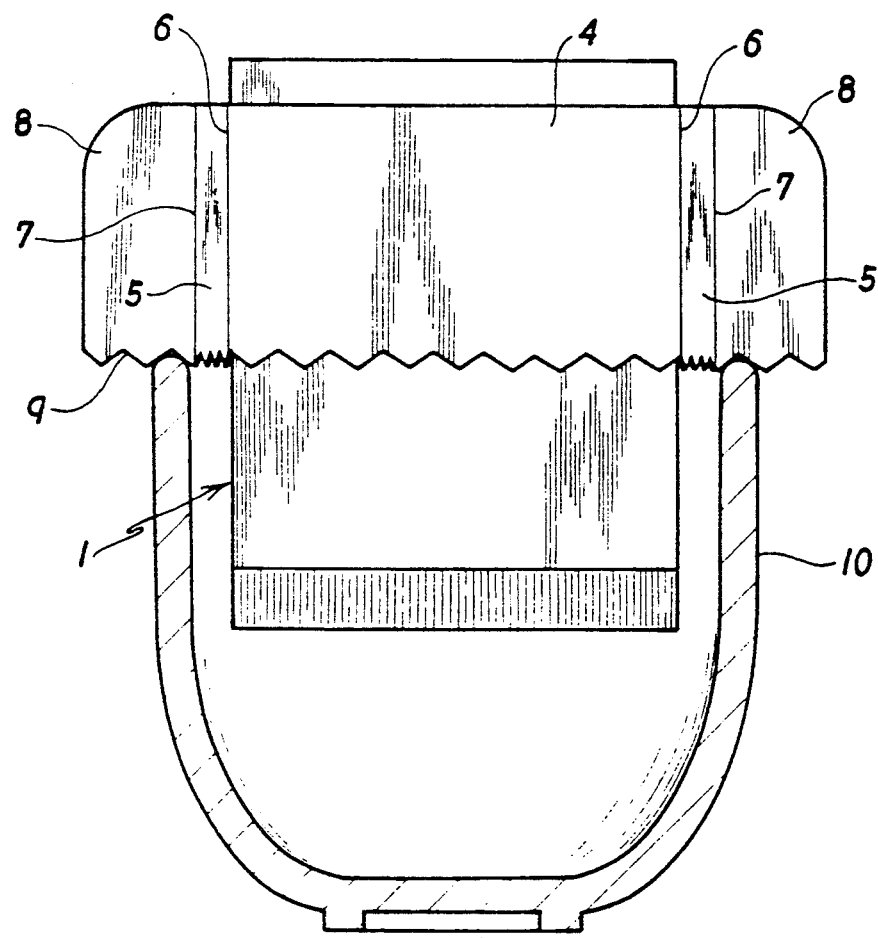
FIG. 4 is a longitudinal section of the embodiment in practical use.

An embodiment of the present invention will now be described with reference to the drawings. A filter paper bag body 1 containing a powdered material, such as coffee powder has gussets walls 2, 2 at both side portions thereof, and perforations 3 at the upper edge portion thereof. When the portion of the bag body 1 which is above the perforations 3 is torn off, the upper edge portion of the bag body 1 can be opened. A reference numeral 4 denotes a frame type support member formed of thick paper and bonded to the paper bag body 1 so that the bag body 1 is held at both surfaces thereof between the opposite surfaces of the support member 4. The arm portions 5, 5 projecting outward from the portions of the support member 4 which correspond to both sides of the bag body 1 are provided with folds 6, 7 so that the arm portions 5, 5 can be bent in the shape of the letter "Y" in plan, and the free end sections of the arm portions 5, 5 are formed into handles 8, 8.

In the powdered drink brewing bag thus formed, the filter paper bag body 1 is unsealed by tearing off the upper edge portion thereof along the perforations 3 as mentioned above, and the two handles 8, 8 are held between the thumbs and fingers and pushed inward. Consequently, the arm portions 5, 5 are bent in the shape of the letter "Y" in plan, and the gusset walls 2, 2 are expanded, so that the upper edge portion of the filter paper bag body 1 can be opened largely. During this time, a shrinkage force is imparted to the gusset walls 2, 2 but the arm portions 5, 5 are maintained in a Y-shaped bent state. Accordingly, even if the hands are removed from the handles 8, 8, the opened condition of the bag body 1 is retained. The arm portions 5, 5 are then placed on the upper edge of a cup 10, and hot water is poured into the opening at the upper edge portion of the bag body 1. This enables a brew of a powdered material 11 in the bag body 1 to be dripped into the cup 10.

The arm portions 5, 5 are provided at the lower edges thereof with locking notches 9, which are engaged with the upper edge of the cup 10 to enable the brewing bag to be supported stably on the cup 10 without any possibility that the brewing bag slips sideways.

The brewing bag may also be so formed that a powdered material is sealed in the portion of the interior of the filter paper bag body 1 which is beneath an inner filter (not shown) provided in the bag body and adapted to pass hot water therethrough. In such a case, it is unnecessary to provide the perforations 3 of FIG. 1 in the brewing bag, i.e., to render the bag openable.

Since the powdered drink brewing bag according to the present invention is provided with folds and handles on the arm portions of the frame type support member, on which the filter paper bag body is supported, in such a manner that the arm portions can be bent in the shape of the letter "Y" in plan, the upper edge portion of the gusset-carrying filter paper bag body can be kept largely open to enable the hot water to be poured thereinto easily. Accordingly, this brewing bag can be used easily, and has a useful effect in serving a drink, such as coffee conveniently.

The present invention is not, of course, limited to the above embodiment; it may be modified in various ways within the scope of the appended claims.

What is claimed is:

1. A powdered drink brewing bag, comprising
   (a) a sealed filter paper bag containing a brewable powdered material therein, said paper bag including two opposing walls connected with one another at their respective adjacent side edges by a pair of opposing gusseted sidewalls; and
   (b) a frame support member formed of thick paper and including a pair of opposing middle portions, each of said middle portions being bonded to an outer, upper surface portion of each of the bag opposing walls, respectively, the pair of opposing gusseted sidewalls of the paper bag being free of the frame support member, the frame support member further including a pair of arms, each arm connecting respective adjacent sides edges of the middle portions, respectively, and projecting outwardly thereform, each of the arms including a pair of first fold lines adjacent the respective side edges of the middle portion, a handle, and a fold line between the handle and the pair of fold lines, the arms being free of the paper bag and being configured so that when the handles are pushed toward one another, each arm is bent in a Y shape in plan and the pair of opposing gusseted sidewalls are expanded, said frame support member being dimensioned sufficient to allow said arms to support the paper bag on the upper edge of a brew-collecting receptacle.

2. A powdered drink brewing bag according to claim 1, wherein lower edges of the frame support member are provided with locking notches.

3. A powdered drink brewing bag according to claim 1, wherein an upper edge portion of the bag is provided with bag unsealing perforations.

* * * * *